United States Patent
Sato et al.

(10) Patent No.: US 8,194,228 B2
(45) Date of Patent: Jun. 5, 2012

(54) LIQUID CRYSTAL LENS IN WHICH A VOLTAGE IMPARTS OPTIMAL FIRST-STAGE OPTICAL PROPERTIES TO THE LIQUID CRYSTAL LENS BY INFLUENCING A LIQUID CRYSTAL LAYER

(75) Inventors: Susumu Sato, Akita (JP); Mao Ye, Akita (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 108 days.

(21) Appl. No.: 11/678,794

(22) Filed: Feb. 26, 2007

(65) Prior Publication Data

US 2007/0139333 A1 Jun. 21, 2007

Related U.S. Application Data

(63) Continuation of application No. PCT/JP2005/015464, filed on Aug. 25, 2005.

(30) Foreign Application Priority Data

Aug. 26, 2004 (JP) .................................. 2004-246860
Feb. 28, 2005 (JP) .................................. 2005-052626

(51) Int. Cl.
*G02F 1/1335* (2006.01)
*G02F 1/1343* (2006.01)

(52) U.S. Cl. ............. 349/200; 349/16; 349/57; 349/142

(58) Field of Classification Search .................. 349/200, 349/13, 14, 16, 17, 57, 139, 142, 193
See application file for complete search history.

(56) References Cited

U.S. PATENT DOCUMENTS

| 4,021,935 | A * | 5/1977 | Witt ............................... 349/13 |
| 4,602,850 | A * | 7/1986 | DeBenedetti .................... 349/41 |
| 5,047,847 | A * | 9/1991 | Toda et al. ...................... 349/200 |
| 6,795,157 | B2 * | 9/2004 | Okuwaki et al. ............... 349/200 |
| 2002/0047837 | A1 | 4/2002 | Suyama et al. | |
| 2002/0145701 | A1 | 10/2002 | Sun et al. | |

(Continued)

FOREIGN PATENT DOCUMENTS

EP 0 785 457 A2 7/1997

(Continued)

OTHER PUBLICATIONS

S. Sato, "Liquid-Crystal lens-cell with variable focal length", Japanese Journal of Applied Physics, 1979, vol. 18, pp. 1679-1683.

(Continued)

*Primary Examiner* — Mark Robinson
*Assistant Examiner* — Paisley L Arendt
(74) *Attorney, Agent, or Firm* — Oblon, Spivak, McClelland, Maier & Neustadt, L.L.P.

(57) ABSTRACT

The focal distance can be greatly changed by performing an electrical control in an optical element. The optical element comprises a first substrate having a first electrode, a second substrate, a second electrode arranged outside the second substrate, and a liquid crystal layer provided between the first substrate and the second substrate and constituted by liquid crystal molecules oriented. A first voltage is applied between the first electrode and the second electrode, thereby controlling the orientation of the liquid crystal molecules, whereby the optical element operates. A third electrode is provided on an insulating layer and outside the second electrode. A second voltage independent of the first voltage is applied to the third electrode, thereby changing the optical properties.

2 Claims, 19 Drawing Sheets

U.S. PATENT DOCUMENTS

2005/0030438 A1 * 2/2005 Nishioka .................. 349/21

FOREIGN PATENT DOCUMENTS

| EP | 0 785 457 A3 |   | 7/1997 |
|---|---|---|---|
| JP | 54-151854 |   | 11/1979 |
| JP | 61-17120 | * | 1/1986 |
| JP | 61-17120 A |   | 1/1986 |
| JP | 62-94822 | * | 5/1987 |
| JP | 62-94822 A |   | 5/1987 |
| JP | 2-226102 A |   | 9/1990 |
| JP | 02226102 A | * | 9/1990 |
| JP | 3-265819 |   | 11/1991 |
| JP | 6-308453 |   | 11/1994 |
| JP | 9-5695 |   | 1/1997 |
| JP | 9-258271 | * | 10/1997 |
| JP | 9-258271 A |   | 10/1997 |
| JP | 9-304748 |   | 11/1997 |
| JP | 10-239676 |   | 9/1998 |
| JP | 11-109303 |   | 4/1999 |
| JP | 11-109304 | * | 4/1999 |
| JP | 11-109304 A |   | 4/1999 |
| JP | 2004-004616 | * | 1/2004 |
| JP | 2004-4616 |   | 1/2004 |
| JP | 2004-184966 | * | 7/2004 |
| JP | 2004-184966 A |   | 7/2004 |

OTHER PUBLICATIONS

S. Sato, "Liquid crystals and application thereof", Sangyo Tosho Co., Ltd., Oct. 14, 1984, pp. 204-206.

T. Nose, et al., "A liquid crystal microlens obtained with a non-uniform electric field", Liquid Crystals, 1989, vol. 5, pp. 1425-1433.

S. Sato, "The world of liquid crystal", Sangyo Tosho Co., Ltd., Apr. 15, 1994, pp. 186-189.

M Honma, et al., "Enhancement of numerical aperture of liquid crystal microlenses using a stacked electrode structure", Japanese Journal of Applied Physics, Aug. 2000, vol. 39, No. 8, pp. 4799-4802.

S. Sato, "Optical properties of liquid crystal lens of any size", Preliminary Reports, 49$^{th}$ meeting of the Applied Physics Society, Mar. 2002, 28p-X-10, p. 1277.

M. Ye, at al., "Optical properties of liquid crystal lens of any size", Japanese Journal of Applied Physics, May 2002, vol. 41, No. 5, pp. L571-L573.

Y. Yokoyama, at al., "Electrically controllable liquid crystal anamorphic lens", 2004 Preliminary Reports, Meeting of the Society of Liquid Crystal, Japan, Sep. 26, 2004, pp. 478-479.

M. Ye, et al., "Liquid crystal anamorphic lens", Japanese Journal of Applied Physics, vol. 44, No. 1A, pp. 235-236.

Toshiaki Nose, et al., "Improvement of Optical Properties and Beam Steering Functions in a Liquid Crystal Microlens with an Extra Controlling Electrode by a Planar Structure", Japanese Journal of Applied Physics, The Japan Society of Applied Physics, Part 1, vol. 39, No. 11, XP-002551197, Nov. 2000, pp. 6383-6387.

Mao Ye, et al., "Double-Layer Liquid Crystal Lens", Japanese Journal of Applied Physics, Japan Society of Applied Physics, vol. 43, No. 3A, XP-001230289, Mar. 1, 2004, pp. L352-L354.

Mao Ye, Bin Wang, and Susumu Sato, "Liquid-crystal lens with a focal length that is variable in a wide range," Applied Optics 43 (2004) pp. 6407-6412.

* cited by examiner

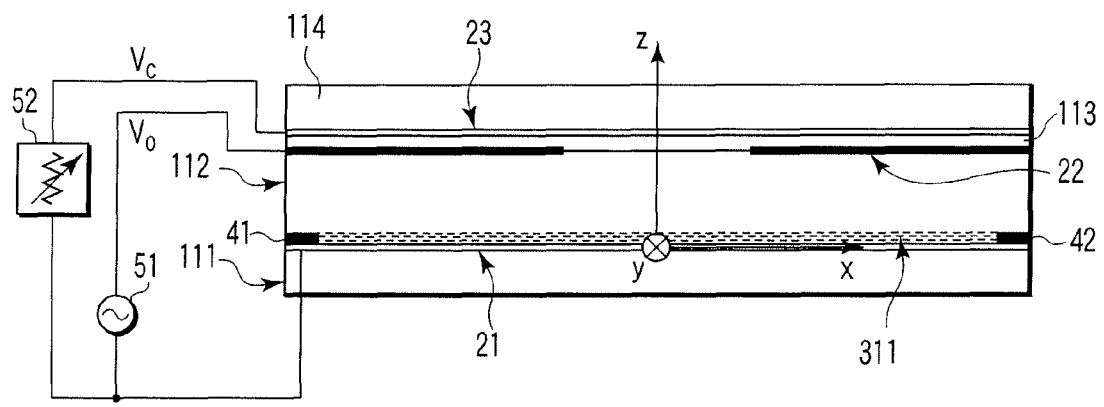
F I G. 1A
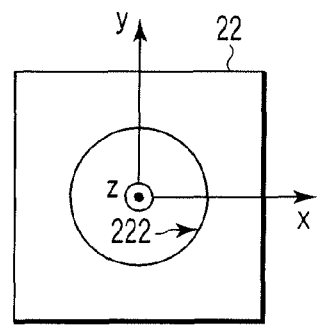
F I G. 1B

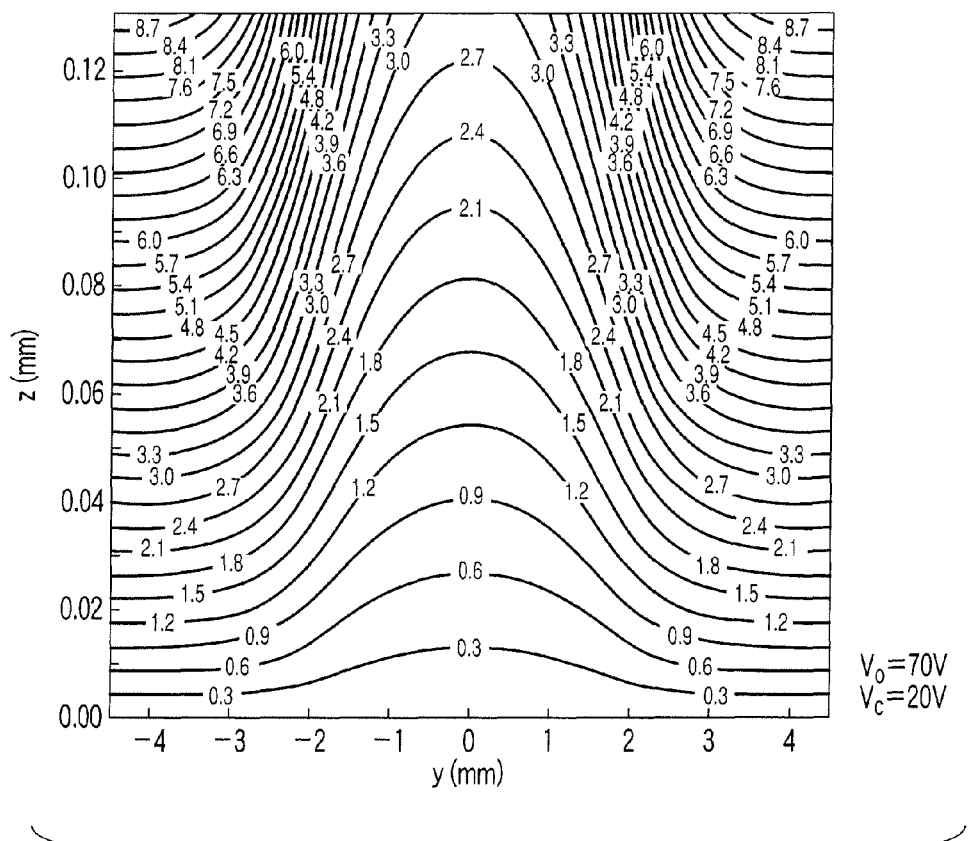
F I G. 3B

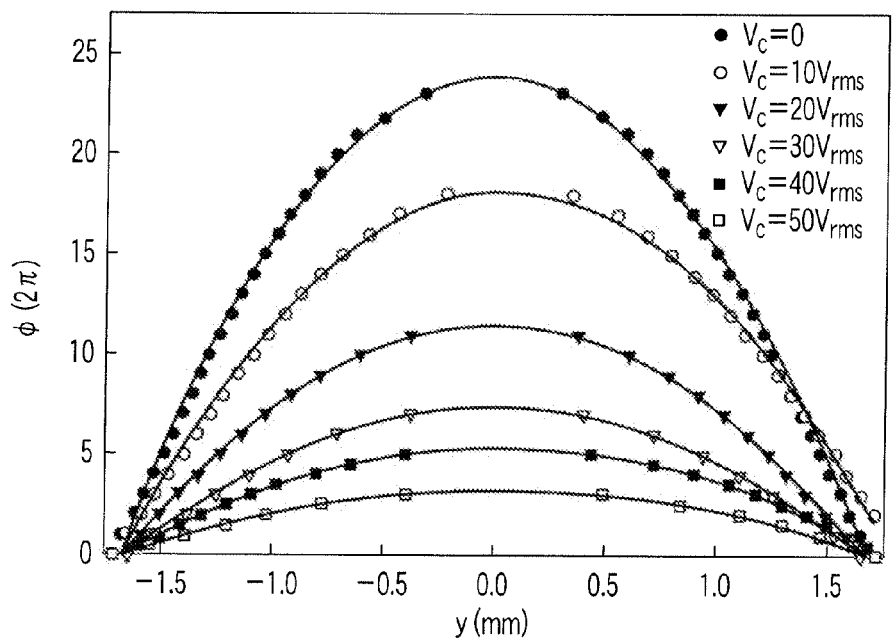
F I G. 5
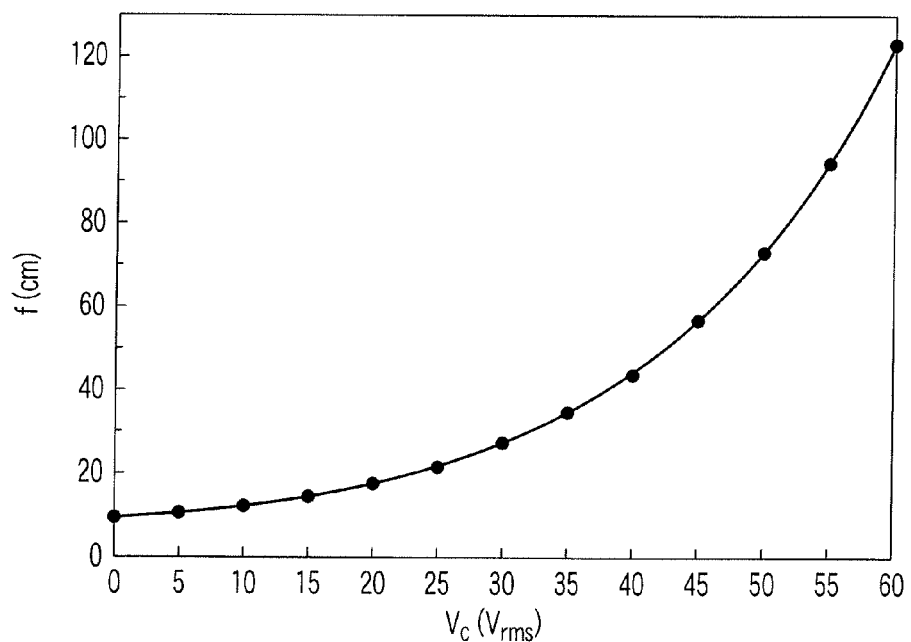
F I G. 6

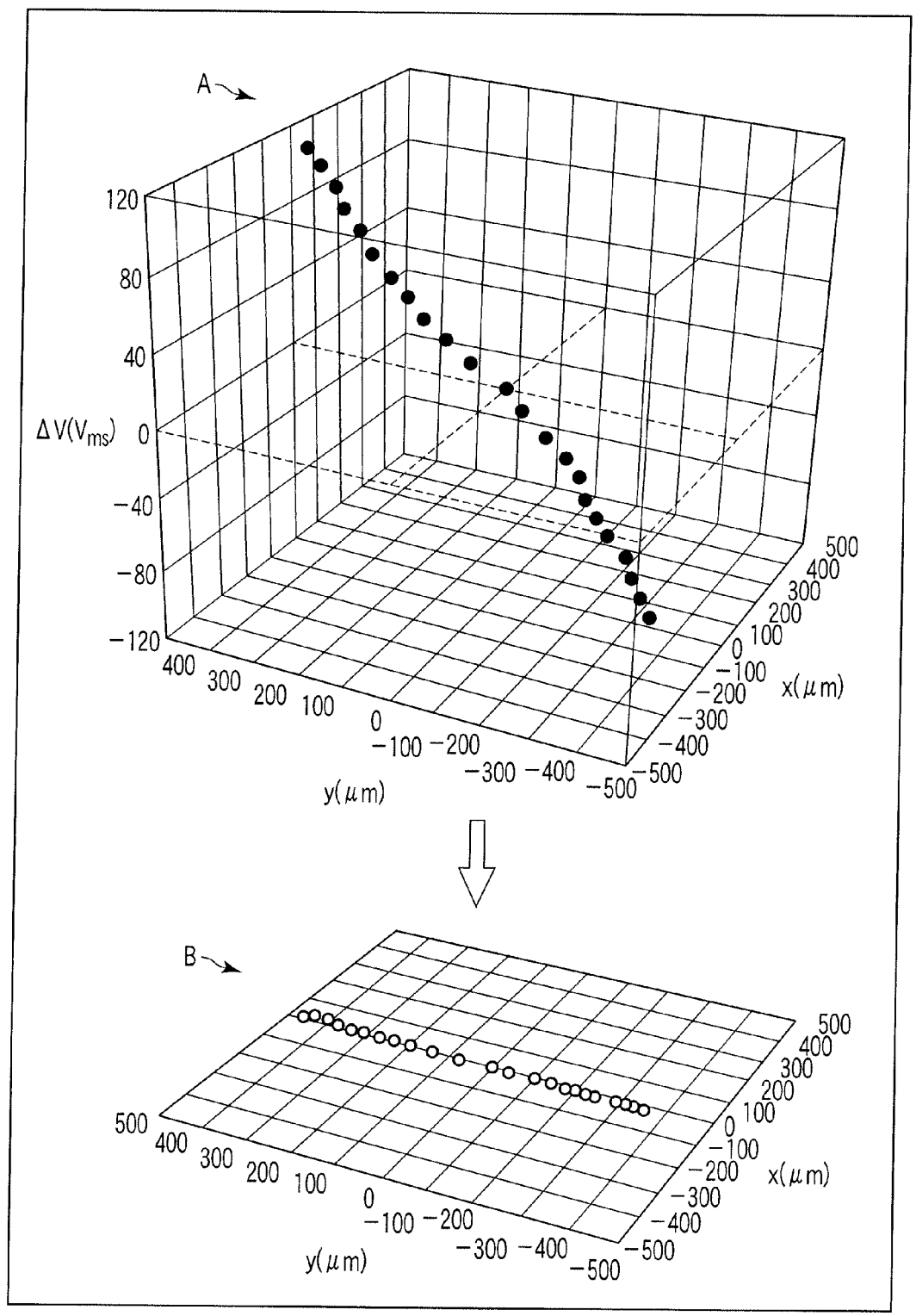
F I G. 12

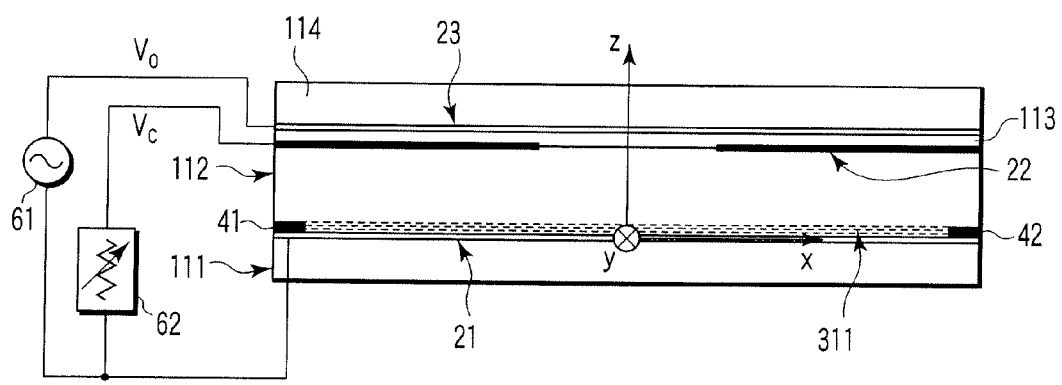
F I G. 14A
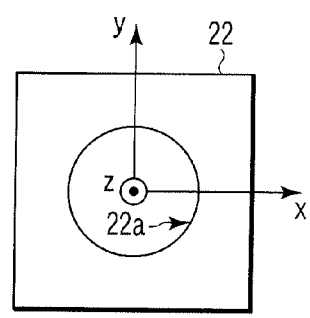
F I G. 14B

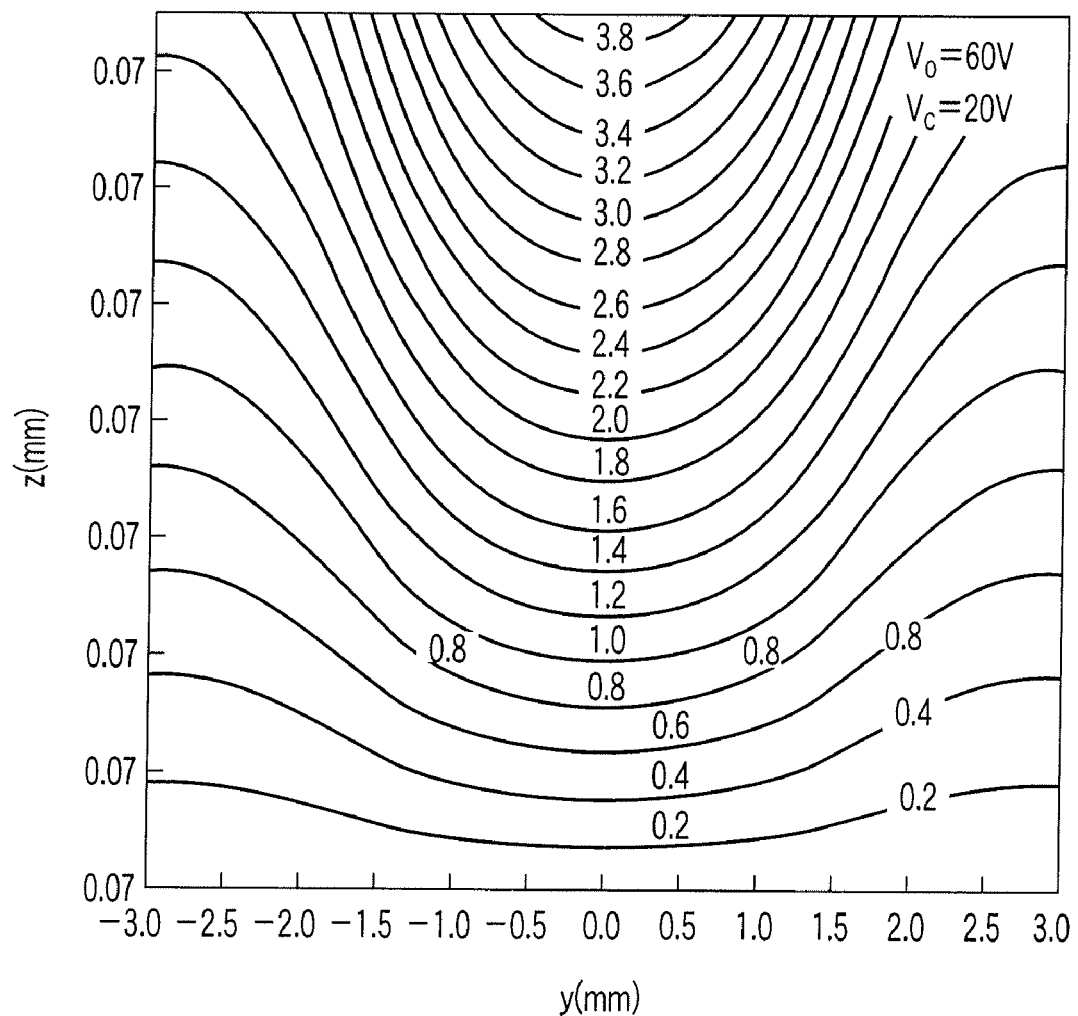
F I G. 16B

LIQUID CRYSTAL LENS IN WHICH A VOLTAGE IMPARTS OPTIMAL FIRST-STAGE OPTICAL PROPERTIES TO THE LIQUID CRYSTAL LENS BY INFLUENCING A LIQUID CRYSTAL LAYER

CROSS REFERENCE TO RELATED APPLICATIONS

This is a Continuation Application of PCT Application No. PCT/JP2005/015464, filed Aug. 25, 2005, which was published under PCT Article 21 (2) in Japanese.

This application is based upon and claims the benefit of priority from prior Japanese Patent Applications No. 2004-246860, filed Aug. 26, 2004; and No. 2005-052626, filed Feb. 28, 2005, the entire contents of both of which are incorporated herein by reference.

BACKGROUND OF THE INVENTION

1. Field of the Invention

The present invention relates to an optical element in which two different voltages are applied between an electrode provided on a substrate constituting a liquid crystal cell and an electrode provided outside the substrate to control the orientation of liquid crystal molecules and in which specific optical properties can be easily adjusted.

2. Description of the Related Art

Liquid crystal has fluidity as liquid and exhibits anisotropy in electro-optical properties. The orientation of liquid crystal molecules can be controlled in various ways. The properties of the liquid crystal have been utilized, developing thin and light weight, flat-type display devices have been remarkably developed in recent years. The orientation of the liquid crystal molecules can be easily controlled if two glass plates constituting a liquid crystal element and having a transparent conductive film are surface-treated and if a voltage is externally applied. The refractive index of any liquid crystal element of this type can be continuously varied from the value it exhibits to extraordinary light to the value it exhibits to ordinary light. This is an excellent property not present in other optical materials.

Focus-variable lenses have been proposed, each of which has the effective refractive index varied (see Patent Document 1 and Non-Patent Documents 1 and 2). Glass substrates having transparent electrodes are bent by utilizing the electro-optical effect of nematic liquid crystal. The liquid crystal layer is thereby shaped like a lens, unlike in the element structure incorporated in the ordinary liquid crystal display. A voltage is applied across the electrodes, controlling the orientation of the liquid crystal molecules. The effective refractive index of the lens is thereby varied.

A method is available in which a spatial distribution of refractive index is imparted to an optical medium, thereby attaining a lens effect. Such optical media, known as SELFOC (GRIN) lenses, are commercially available. In a nematic liquid crystal cell, the liquid crystal molecules are oriented in the direction of an electric field. Methods of providing liquid crystal lenses that exhibit a spatial distribution of refractive indices have been reported (see Patent Document 2, Patent Document 3, and Non-Patent Documents 3 and 4). In these methods, an electrode having a circular pattern is used, generating an axially symmetrical non-uniform electric field, and obtaining thereby a liquid crystal lens by utilizing the effect of the liquid-crystal molecular orientation.

As Patent Document 4 discloses, a mesh-like macromolecule network in the liquid crystal in order to improve the properties of the liquid crystal. It is comparatively easy to modify such a lens using liquid crystal into a microlens array that comprises a number of tiny, so-called microlenses arranged two-dimensionally, thus forming a flat plate.

It has been proposed that, in a liquid crystal microlens, a pair of electrodes should be provided outside the electrode of a circular pattern to improve the lens properties (see Non-Patent Document 5). Further, a method has been proposed, in which an insulating layer is inserted between a liquid crystal layer and an electrode having a circular pattern, and the requirement that the ratio of the diameter of the circular pattern to the thickness of the liquid crystal layer should be 2:1 to about 3:1 to impart optimal properties to a microlens is mitigated (see Non-Patent Documents 6 and 7).

On the other hand, an optical apparatus has been proposed, which uses a liquid crystal element instead of a lens mirror (see Patent Document 5). In this apparatus, an imaging device detects an optical image obtained by an optical system having a focusing unit with an aberration-correcting mechanism, and the aberration is determined from a signal generated by the imaging device. A signal for correcting the aberration is generated, thereby correcting the aberration occurring in the optical system due to a sway of the atmosphere, in order to provide an optical image that is not distorted. Further, an electric-field controlled, anamorphic liquid crystal lens having an elliptical distribution of refractive index has been proposed as a lens that utilizes a liquid-crystal optical element (see Non-Patent Document 8).

Unlike the ordinary optical element, which is a passive element, these optical elements using liquid crystal can provide lenses that can adjust properties, such as focal distance, and the aberration of an optical system.

Polymerization-curable liquid crystal can be used as liquid crystal material. In this case, the liquid crystal is polymerized and is thereby cured, providing a polymer lens, after the focal distance is adjusted (see Patent Document 6).

Pat. Doc. 1: Jpn. Pat. Appln. KOKAI Publication No. 54-151854

Pat. Doc. 2: Jpn. Pat. Appln. KOKAI Publication No. 11-109303

Pat. Doc. 3: Jpn. Pat. Appln. KOKAI Publication No. 11-109304

Pat. Doc. 4: Jpn. Pat. Appln. KOKAI Publication No. 10-239676

Pat. Doc. 5: Jpn. Pat. Appln. KOKAI Publication No. 03-265819

Pat. Doc. 6: Jpn. Pat. Appln. KOKAI Publication No. 09-005695

Non-Pat. Doc. 1: S. Sato, "Liquid-crystal lens-cell with variable focal length", Japanese Journal of Applied Physics, 1979, Vol. 18, pp. 1679-1683

Non-Pat. Doc. 2: S. Sato, "Liquid crystals and application thereof", Sangyo Tosho Co., Ltd., Oct. 14, 1984, pp. 204-206

Non-Pat. Doc. 3: T. Nose and S. Sato, "A liquid-crystal micro lens obtained with a non uniform electric field", Liquid Crystals, 1989, pp. 1425-1433

Non-Pat. Doc. 4: S. Sato, "The world of liquid crystal", Sangyo Tosho Co., Ltd., Apr. 15, 1994, pp. 186-189

Non-Pat. Doc. 5: M. Honma, T. Nose and S. Sato, "Enhancement of numerical aperture of liquid crystal microlenses using a stacked electrode structure", Japanese Journal of Applied Physics, August 2000, Vol. 39, No. 8, pp. 4799-4802

Non-Pat. Doc. 6: M. Ye and S. Sato, "Optical properties of liquid crystal lens of any size", Preliminary reports, 49th meeting of the Applied Physics Society, March 2002, 28p-X-10, p. 1277

Non-Pat. Doc. 7: M. Ye and S. Sato, "Optical properties of liquid crystal lens of any size", Japanese Journal of Applied Physics, May 2002, Vol. 41, No. 5, pp. L571-L573

Non-Pat. Doc. 8: Y. Yokoyama, M. Ye and S. Sato, "Electrically controllable liquid crystal anamorphic lens", 2004 preliminary reports, meeting of the Society of Liquid Crystal, Japan, Sep. 26, 2004

BRIEF SUMMARY OF THE INVENTION

The liquid crystal lens having a lens-shaped liquid crystal layer, the liquid crystal microlens utilizing the spatial refractive-index distribution of liquid crystal molecules, achieved by an axially symmetrical non-uniform electric field and generated by a circular-pattern electrode, a method in which a pair of electrodes are provided outside a circular-pattern electrode, as proposed in Non-Patent Document 5, and a structure in which an insulating layer is provided between a liquid crystal layer and a circular-pattern electrode, as proposed in Non-Patent Documents 6 and 7, all described above, can attain good optical properties. They have a problem, however. They can hardly acquire good properties over a wide range of the voltage applied.

Accordingly, an object of one embodiment of this invention is to provide an optical element that has good optical properties, which can be changed easily and greatly while being maintained.

An object of another embodiment of this invention is to provide an optical element in which the focus can be moved in a three-dimensional fashion.

An object of still another embodiment of this invention is to provide such optical properties as can be controlled for either convex lenses or concave lenses.

To solve the above-mentioned problem, an optical element according to this invention comprises basically a first substrate having a first electrode, a second substrate, a second electrode arranged outside the second substrate and having a hole, and a liquid crystal layer provided between the first substrate and the second substrate and constituted by liquid crystal molecules oriented in one direction. A first voltage is applied between the first electrode and the second electrode, controlling the orientation of the liquid crystal molecules, whereby the optical element operates. In the optical element, a third electrode is arranged outside the second electrode and provided on an insulating layer, and a second voltage, which is independent of the first voltage, is applied to the third electrode, thereby controlling the optical properties.

Owing to the means described above, the focal position can be greatly varied by electrical control, without mechanically moving the lens back and forth as in the conventional optical element.

BRIEF DESCRIPTION OF THE SEVERAL VIEWS OF THE DRAWING

FIG. 1A is a sectional view showing the configuration of an embodiment of an optical element according to the present invention;

FIG. 1B is a plan view showing the configuration of the embodiment of the optical element according to this invention;

FIG. 3B is a diagram showing a second example in which the potential distribution changes in the optical element according to this invention, and thus explaining the function of the optical element;

FIG. 5 is a diagram showing how a light wave passing through the optical element according to this invention changes in optical phase, and thus explaining the function of the optical element;

FIG. 6 is a diagram showing how the focal distance changes with the control voltage, and thus explaining the function of the optical element according to this invention;

FIG. 12 is a diagram showing the potential applied to the split electrode shown in FIG. 10 and the y-direction moment of the focus, both actually measured;

FIG. 14A is a sectional view showing the configuration of a further embodiment of the optical element according to the present invention;

FIG. 14B is a plan view showing the configuration of the further embodiment of the optical element according to this invention;

FIG. 16B is a diagram showing a second example in which the potential distribution changes in the optical element of FIGS. 14A and 14B, and thus explaining the function of this optical element;

DETAILED DESCRIPTION OF THE INVENTION

Figure 2:
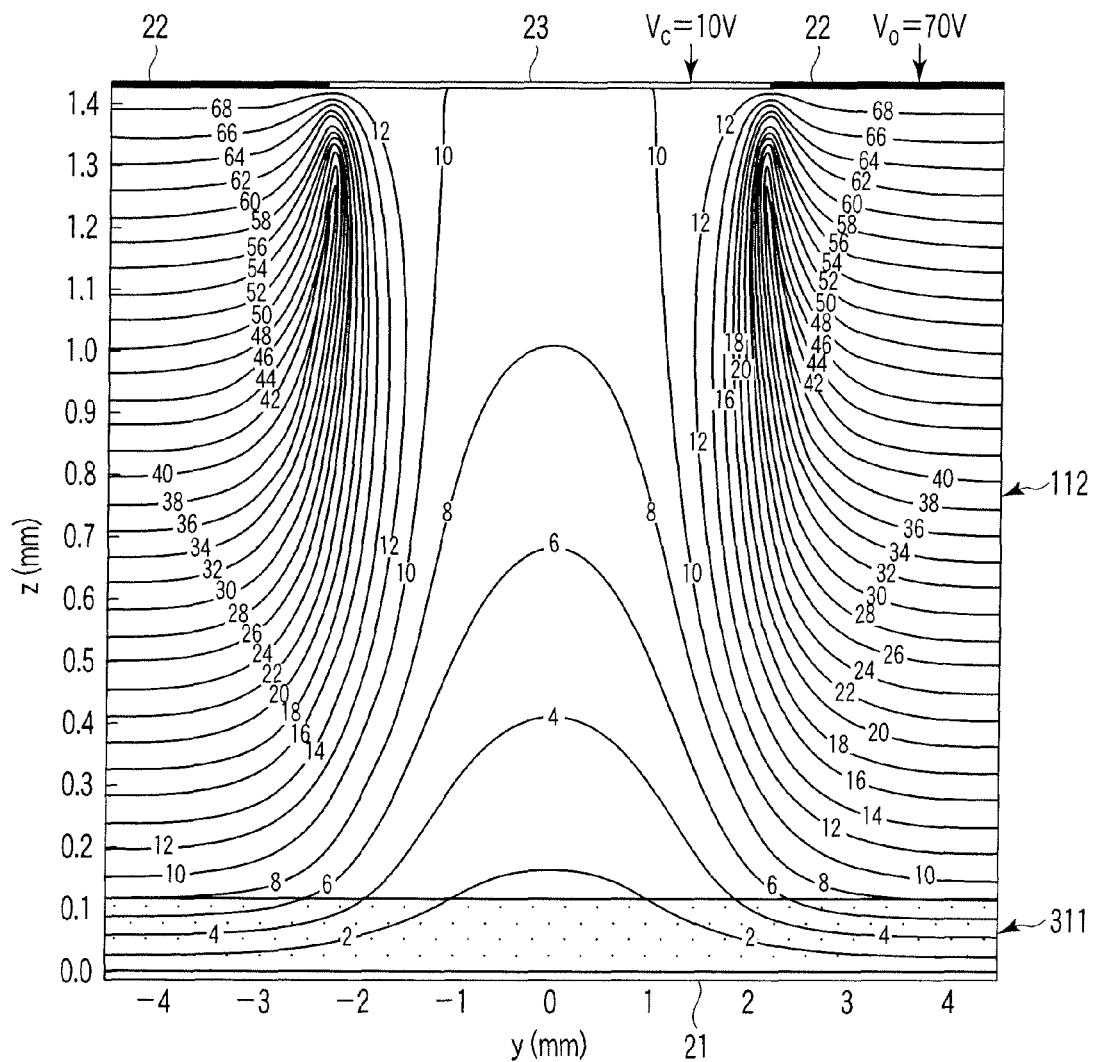
FIG. 2 is a diagram showing a potential distribution in the element, and thus explaining the function of the optical element according to this invention.

Embodiments of the present invention will be described in detail, with reference to the accompanying drawings. FIGS. 1A and 1B, number 111 designates a first substrate (transparent glass plate). A first electrode 21 (made of ITO) is formed on the inner surface of the first substrate 111. On the side of the first electrode 21, a second substrate 112 (transparent glass plate) is arranged, facing the first electrode 21 and extending parallel thereto. Outside the second substrate 112, a second electrode 22 (made of Al) is formed. As shown in FIG. 1B, the second electrode 22 has a circular hole 222 (having a diameter of, for example, 4.5 mm).

A liquid crystal layer 311 (having a thickness of, for example, 130 μm) is formed between the first electrode 21, which is formed on the first substrate 111, and the second substrate 112. Reference numbers 41 and 42 denote spacers that define the liquid crystal layer 311.

Further, an insulating layer 113 (e.g., glass layer as thin as, for example, 70 μm) is provided on the upper surface of the second electrode 22, and a third electrode 23 (made of ITO) is formed on the insulating layer 113. A protective layer 114 (made of glass) is arranged on the upper surface of the third electrode 23. Those surfaces of the first and second substrates, which contact the liquid crystal layer, are coated with polyimide and have been rubbed in the x-axis direction.

To make the optical element function as a liquid crystal lens, a first voltage Vo is applied between the first electrode 21 and the second electrode 22. To apply the first voltage Vo, a second voltage Vc is initially set to 0 V and the first voltage Vo is set to an appropriate value. The voltage Vo is applied from a voltage-applying unit 51. The voltage is set to such a value as will impart optimum optical properties (hereinafter referred to as first-stage optical properties) to the lens. Next, a second voltage Vc, which is independent of the first voltage Vo, is applied between the first electrode 21 and the third electrode 23. The second voltage Vc is output from a voltage-applying unit 52. If the second voltage Vc is varied, the optical properties (hereinafter referred to as second-stage optical properties) of the lens can be controlled. Note that Vo and Vc are identical in frequency and phase.

In the present invention, the second-stage optical properties are changed from the values at which the focal distance is very short to the values at which the focal distance is infinitely long or almost infinitely long. The focal distance can vary over a broad range. Hence, the present invention is practically valuable and can be applied to various uses.

FIG. 2 shows a potential distribution in the space between the first and second electrodes, which is observed when Vo=70 V (fixed value for optimal properties) is applied between the first electrode 21 and the second electrode 22 and the second voltage (control voltage) Vc=10 V is applied to the third electrode 23. In FIG. 2, z is the optical-axis direction, and y is the direction intersecting at right angles with the optical axis. Note that z, y and x are identical to z, y and x shown in FIG. 1. If the equipotential lines define a steep gradient, the lens will have a short focal distance. If they define a gentle gradient, the lens will have a long focal distance.

Figure 3A:
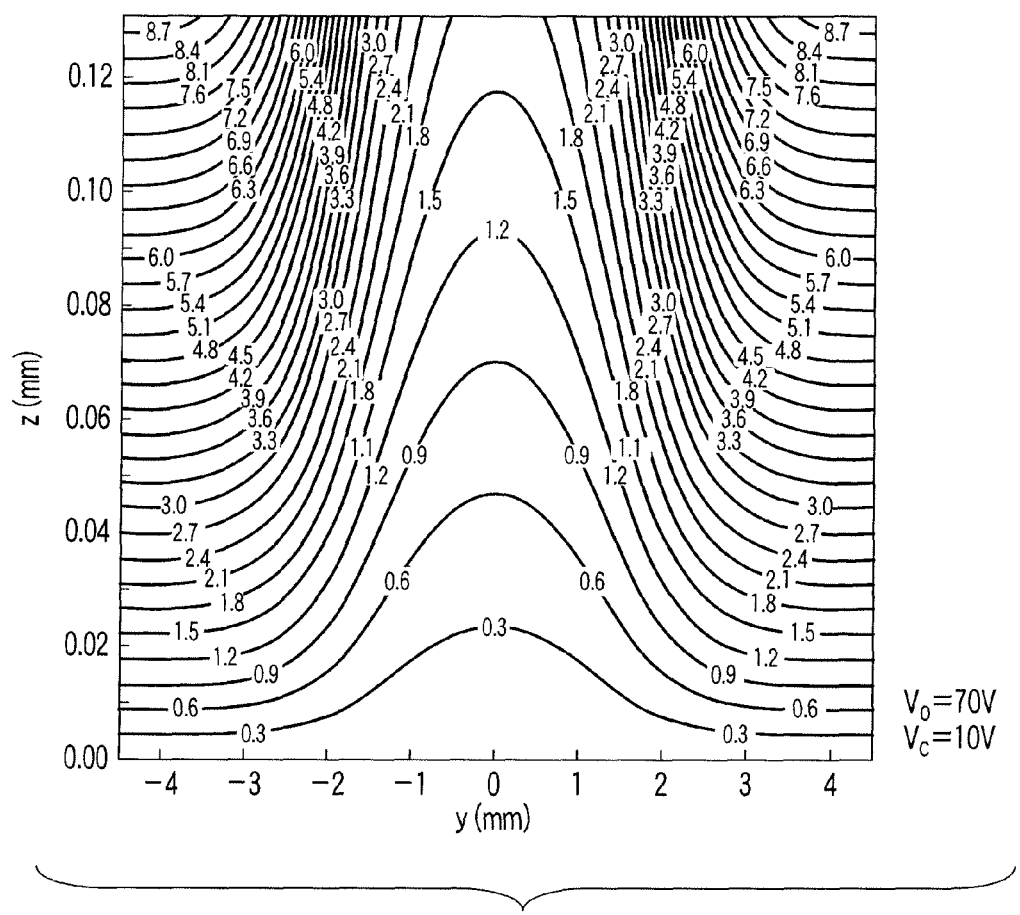
FIG. 3A is a diagram showing a first example in which the potential distribution changes in the optical element according to this invention, and thus explaining the function of the optical element.

FIG. 3A and FIG. 3B show other potential distributions, i.e., two potential distributions that may be observed in the liquid crystal layer. FIG. 3A shows a potential distribution that is observed when Vo=70 V (a fixed value for optimum properties) is applied between the first electrode 21 and the second electrode 22 and the second voltage (control voltage) Vc=10 V is applied between the first electrode 21 and the third electrode 23. FIG. 3B shows a potential distribution that is observed when the control voltage is varied and the second voltage (control voltage) Vc=20 V is applied. This change in the potential distribution corresponds to the inclination angle of the liquid crystal molecules and to the refractive angle of light. The focal distance is longer in the state of FIG. 3B than in the state of FIG. 3A.

Figure 4:
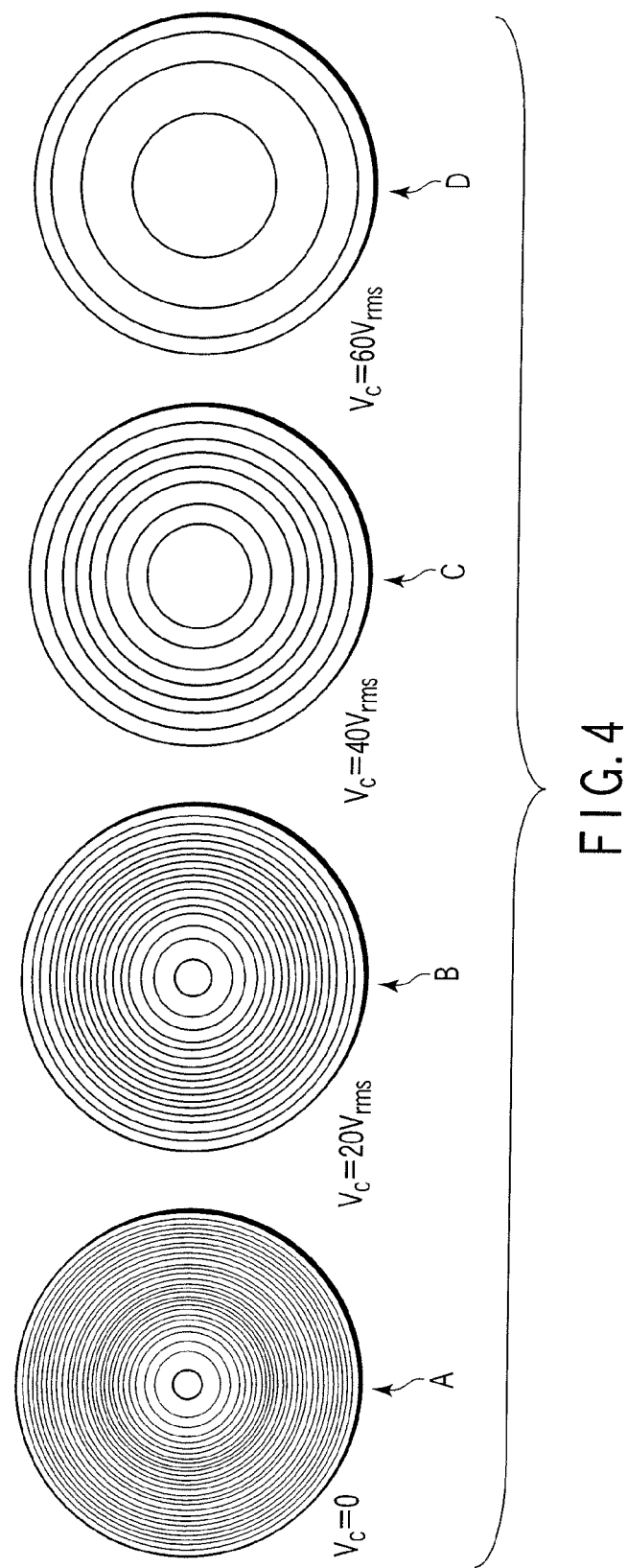
FIG. 4 is a diagram showing how a light wave passing through the optical element according to this invention changes in optical phase, as viewed in the optical axis of the optical element.

In FIG. 4, A, B, C and D show how the phase of a light wave is distributed as viewed in the optical axis of the optical element according to this invention. More precisely, A, B, C and D show how the phase distribution of the light wave changes as the control voltage Vc applied to the third electrode 23 is varied to 0 V, 20 V, 40 V and 60 V, while applying the fixed voltage Vo=70 V to the first electrode 21 and second electrode 22. As seen from A to D in FIG. 4, the higher the control voltage Vc, the longer the spaces between the interference fringes. The longer the spaces between the interference fringes, the less prominent the refraction of the light will be and, hence, the longer the focal distance will be.

FIG. 5 shows how a light wave passing through a liquid crystal lens comes to have an optical phase delay $\phi$. Basically, the light has square-distribution characteristic. Therefore, its phase delay gradually decreases outwards from the y axis. As the control voltage (second voltage) is increased, the phase difference between the center of the lens and the periphery thereof decreases. Thus, the focal distance is longer when Vc=50 V than when Vc=10 V.

FIG. 6 represents the relation between the change in the focal distance of the optical element according to this invention and the control voltage Vc mentioned above. The focal distance varies as the control voltage Vc is changed. The present invention is not limited to the embodiment described above.

Figure 7:
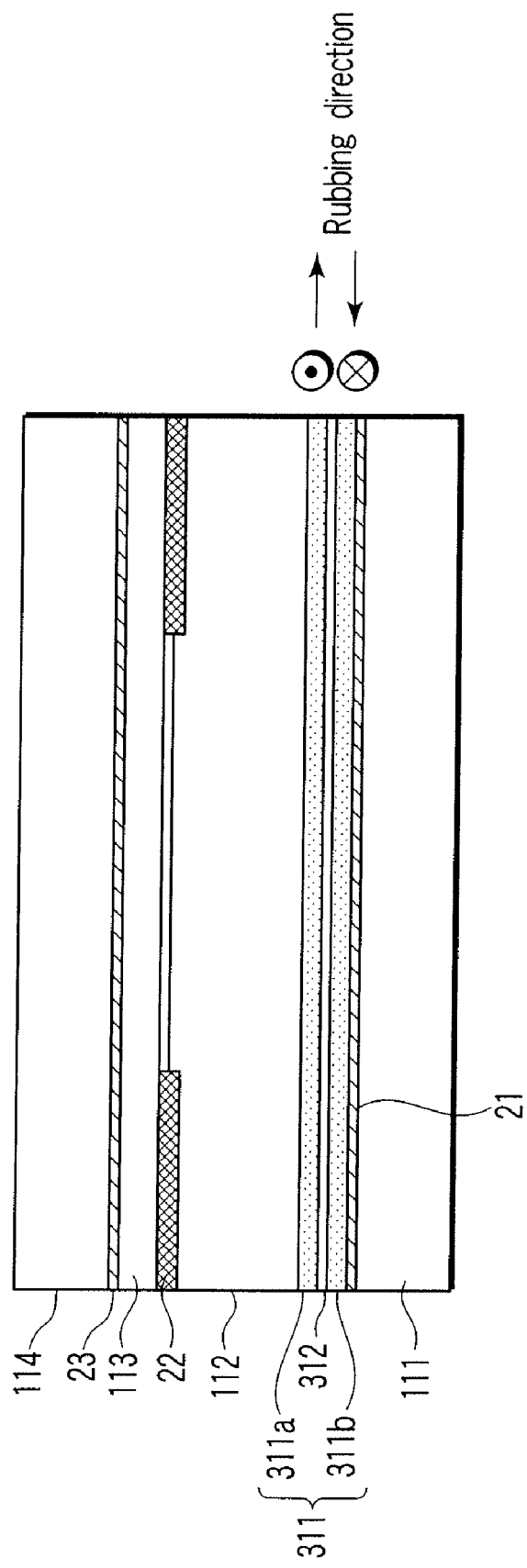
FIG. 7 is a sectional view showing the configuration of another embodiment of the optical element according to the present invention.

FIG. 7 shows the configuration of another embodiment of the present invention. The components identical to those shown in FIG. 1 are denoted by the same reference numbers. This embodiment differs from the first embodiment in the structure of the liquid crystal layer 311. In the present embodiment, the liquid crystal layer 311 is composed of a first liquid crystal layer 311a, a second liquid crystal layer 311b, and an insulating layer 312 (made of transparent glass). The first and second liquid crystal layers 311a and 311b are spaced apart, with the insulating layer 312 interposed between them.

Thus configured, the liquid crystal layer 311 can respond at an extremely high speed. The response speed of any liquid crystal layer is inversely proportional to the square of the layer thickness. Hence, the layer 311 can respond to a control signal four times faster than the element of FIG. 1, because it comprises two liquid crystal layers, i.e., the first layer 311a and the second layer 311b.

Having a two-layer structure, the liquid crystal layer 311 can achieve the following advantage. If the liquid crystal layers 311a and 311b have been rubbed in the same direction, the liquid crystal molecules are oriented in the same direction in both layers 311a and 311b. As a result, the lens can acquire a magnifying power twice as large as that of a single-layer lens. In other words, it can attain the same effect as two lenses combined together and can, therefore, a short focal distance.

Further, the lens can function as a liquid crystal element without a polarizing plate if the liquid crystal layers 311*a* and 311*b* have been rubbed in two directions intersecting at right angles, respectively.

Figure 8A:
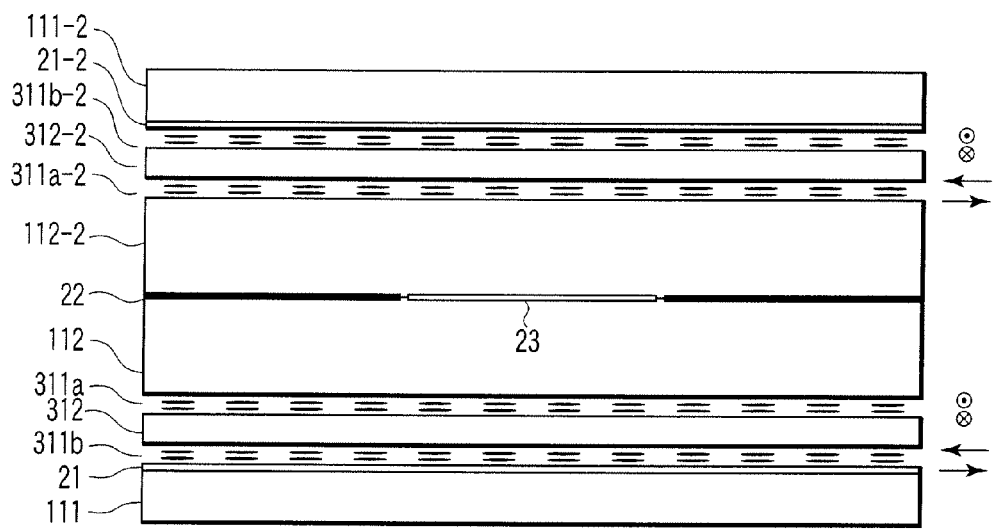
FIG. 8A is a sectional view showing the configuration of a further embodiment of the optical element according to the present invention.
Figure 8B:
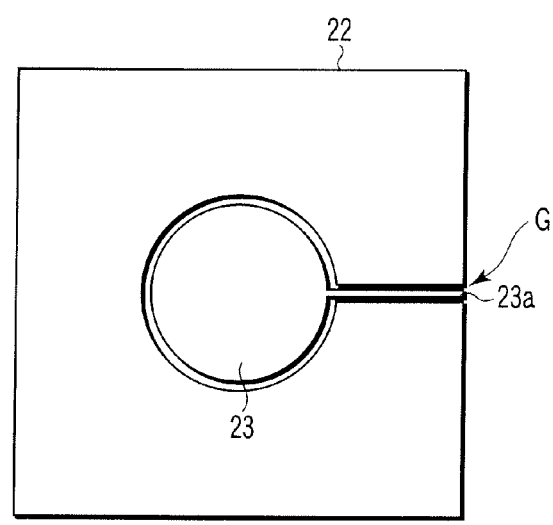
FIG. 8B is a plan view showing the configuration of the further embodiment of the optical element according to this invention.

FIG. 8A and FIG. 8B show still another embodiment of the present invention. This optical element is composed of two elements that are identical to the element shown in FIG. 7. It is a two-unit structure having an upper unit and a lower unit that are symmetrical to each other. The components (first element unit) identical to those shown in FIG. 7 are designated by the same reference numerals. The first and second element units share the second and third electrodes 22 and 23. The second element unit is laid on the first element unit. The second element unit has substrates 111-2 and 112-2, an electrode 21-2, a first liquid crystal layer 311*a*-1, a second liquid crystal layer 311*b*-2, an insulating layer 312-2, a common second electrode 22, and a common third electrode 23. In this embodiment, a gap G is provided between the second electrode 22 and the third electrode 23, because these electrodes 22 and 23 lie in the same plane. The second electrode 22 has a slit 23*a* that extends from its hole to one of its sides. A lead line 23*a* is led from the third electrode 23, through the slit 23*a*. A control voltage Vc is applied through the lead line 23*a*.

The upper liquid crystal layer and the lower liquid crystal layer, which are symmetrical to each other, may be composed of two or more layers each. If this is the case, the lens power and the response speed will be further improved.

In the present invention, the liquid crystal layers may be made of material of two-frequency driven type, which that functions as N-type when driven by a high-frequency signal (tens of kilohertz) and as P-type when driven by a low-frequency signal (about 100 Hz). If the liquid crystal layers are made of such material, the response speed of the orienting operation of liquid crystal molecules can be raised.

Figure 9A:
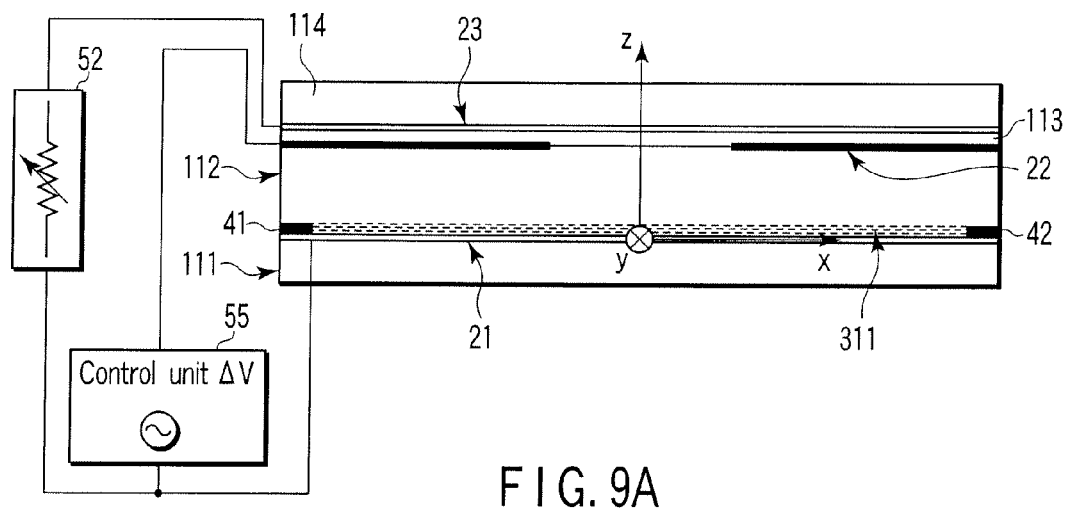
FIG. 9A is a sectional view showing the configuration of another embodiment of the optical element according to the present invention.
Figure 9B:
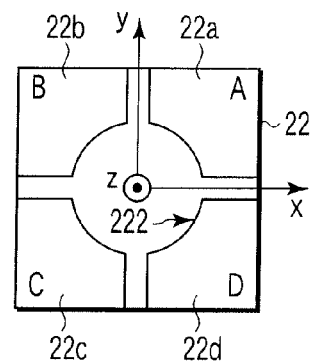
FIG. 9B is a plan view showing the configuration of the other embodiment of the optical element according to this invention.

FIG. 9A and FIG. 9B show another embodiment of the present invention. In the embodiment shown in FIGS. 1A and 1B, a fixed voltage is applied to the second electrode 22. In this embodiment, the second electrode 22 is divided into two or more segments, for example four electrode segments 22*a* to 22*d* as shown in FIG. 9B. The voltages applied to these electrodes can be minutely changed by a control unit 55. In any other respect, this embodiment is identical to the embodiment of FIGS. 1A and 1B.

Figure 10A:
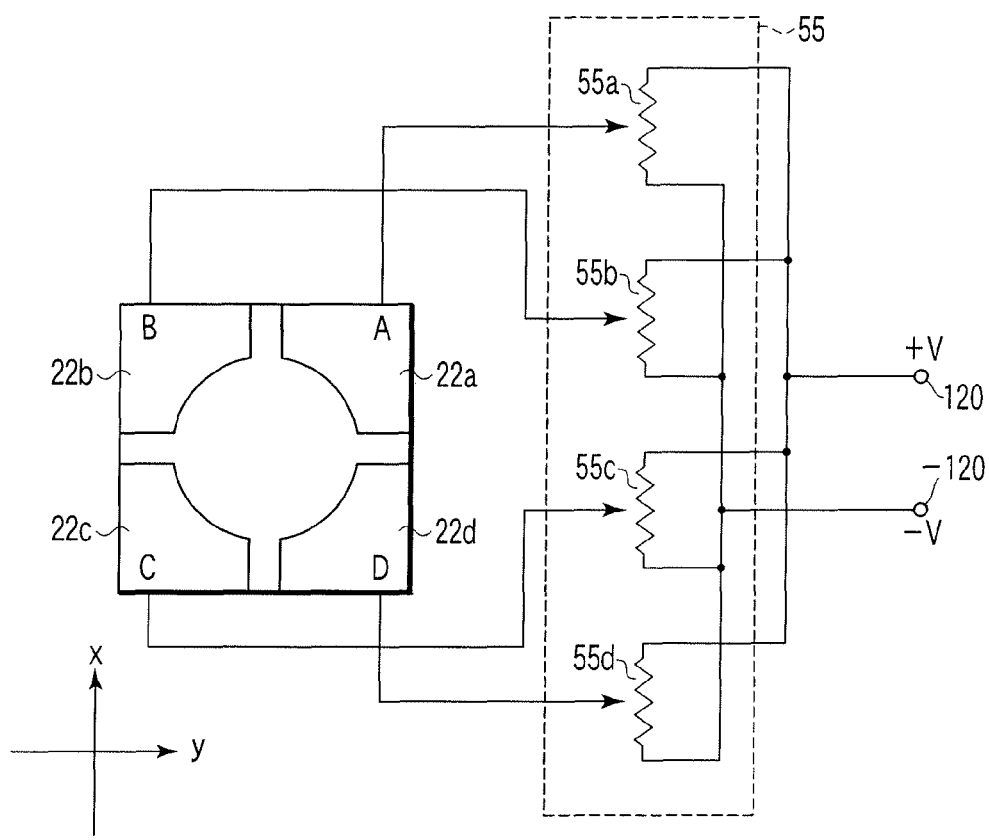
FIG. 10A is a diagram explaining the specific configuration of the control unit shown in FIG. 9.
Figure 10B:
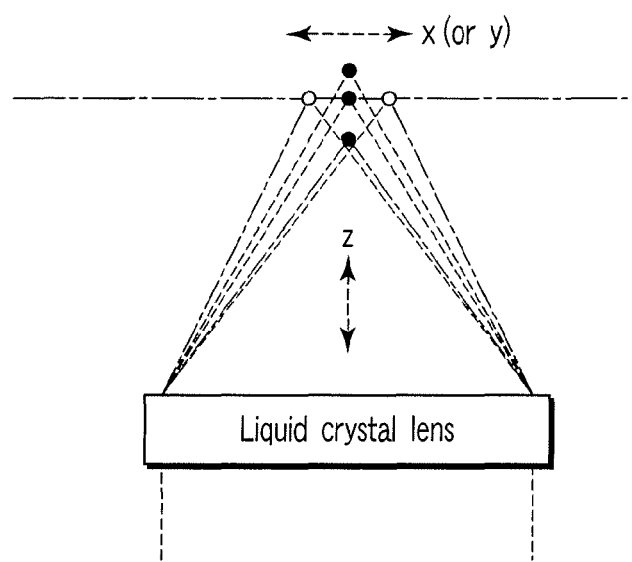
FIG. 10B is a diagram explaining how the focus of the liquid crystal lens is moved in the control unit shown in FIG. 9.

FIG. 10A shows the configuration of the control unit 55. FIG. 10B explains how the focus moves when the control unit 55 controls the position of the focus.

The voltage applied to the electrode segment 22*a* comes from the sliding tap of a variable resistor 55*a*. Its value is ranges from voltage +V and voltage −V. Similarly, the voltage applied to the electrode 22*b* comes from the sliding tap of a variable resistor 55*b* and ranges voltage +V and voltage −V; the voltage applied to the electrode 22*c* comes from the sliding tap of a variable resistor 55*c* and ranges voltage +V and voltage −V; and the voltage applied to the electrode 22*c* comes from the sliding tap of a variable resistor 55*d* and ranges voltage +V and voltage −V.

As the voltages applied to the electrode segments 22*a* to 22*d* are minutely changed, the focus can be moved in the x-axis direction or the y-axis direction, or in both directions. In addition, the focus can be moved in the z-axis direction. Thus, the focal position can be controlled in a three-dimensional fashion.

Figure 11:
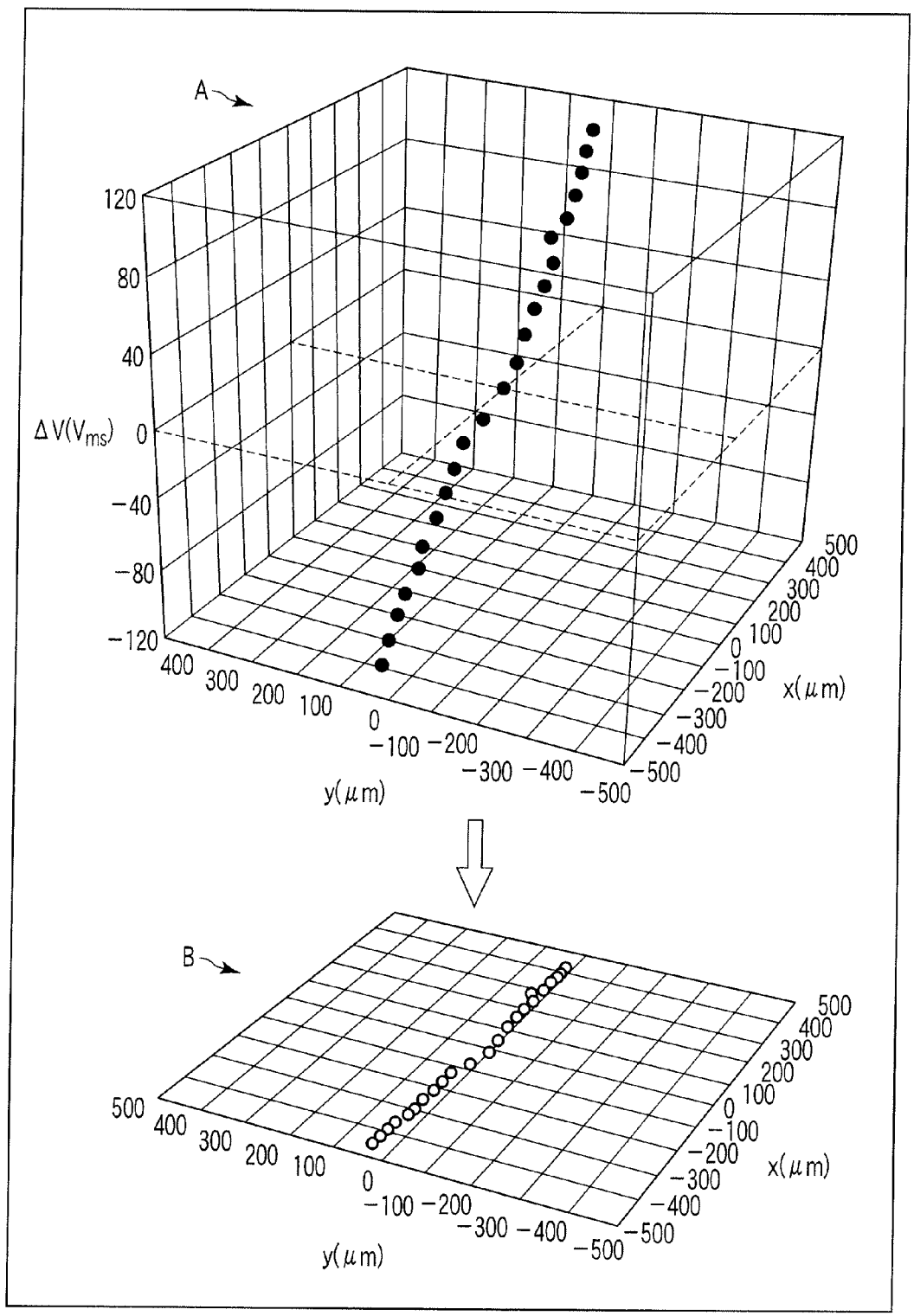
FIG. 11 is a diagram showing the potential applied to the split electrode shown in FIG. 10 and the x-direction movement of the focus, both actually measured.

In FIG. 11, A and B show how the focal position is controlled in the x-axis direction while being held in the focal plane, by adjusting the voltage Vc. More precisely, A in FIG. 11 shows how the focus moves in a space as the voltage applied to the second electrode 22 is changed. B in FIG. 12 shows the position the focus takes in the focal plane.

In FIG. 12, A and B show how the focal position is controlled in the y-axis direction. More precisely, A in FIG. 12 shows how the focus moves in a space as the voltage applied to the second electrode 22 is changed. B in FIG. 12 shows the distance the focus moves.

Figure 13:
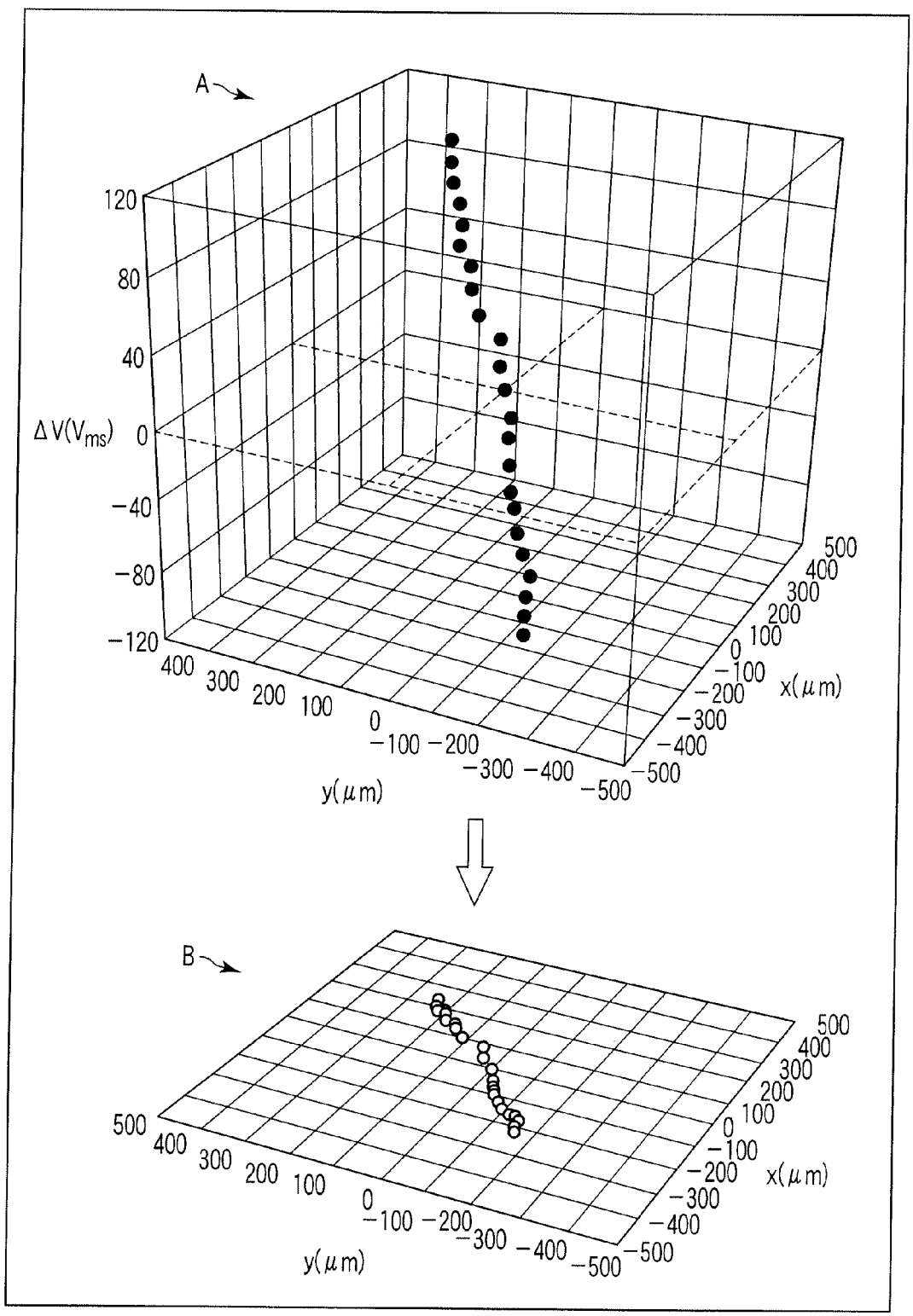
FIG. 13 is a diagram showing the potential applied to the split electrode shown in FIG. 10 and the movement of the focus in a direction at an angle to the x-direction and the y-direction, both the potential and the movement having been actually measured.

In FIG. 13, A and B show how the focal position is controlled in the x-axis direction and the y-axis direction. Namely, A in FIG. 13 shows the voltage applied to the second electrode 22, and B in FIG. 13 shows the distance the focus moves.

This invention is not limited to the embodiments described above. In these embodiments, the liquid crystal lens functions as a convex lens. Nonetheless, the liquid crystal lens can be easily made to work as a concave lens, too, according to the present invention.

FIGS. 14A and 14B shows an embodiment in which the liquid crystal lens functions as a concave lens. In this case, a voltage-applying unit 61 applies a constant AC voltage Vo between the first electrode 21 and the third electrode 23, and a voltage-applying unit 62 applies the voltage Vc between the first electrode 21 and the second electrode 22. The voltage Vc can be varied. In any other respect, this embodiment is identical to the embodiment shown in FIGS. 1A and 1B.

Figure 15:
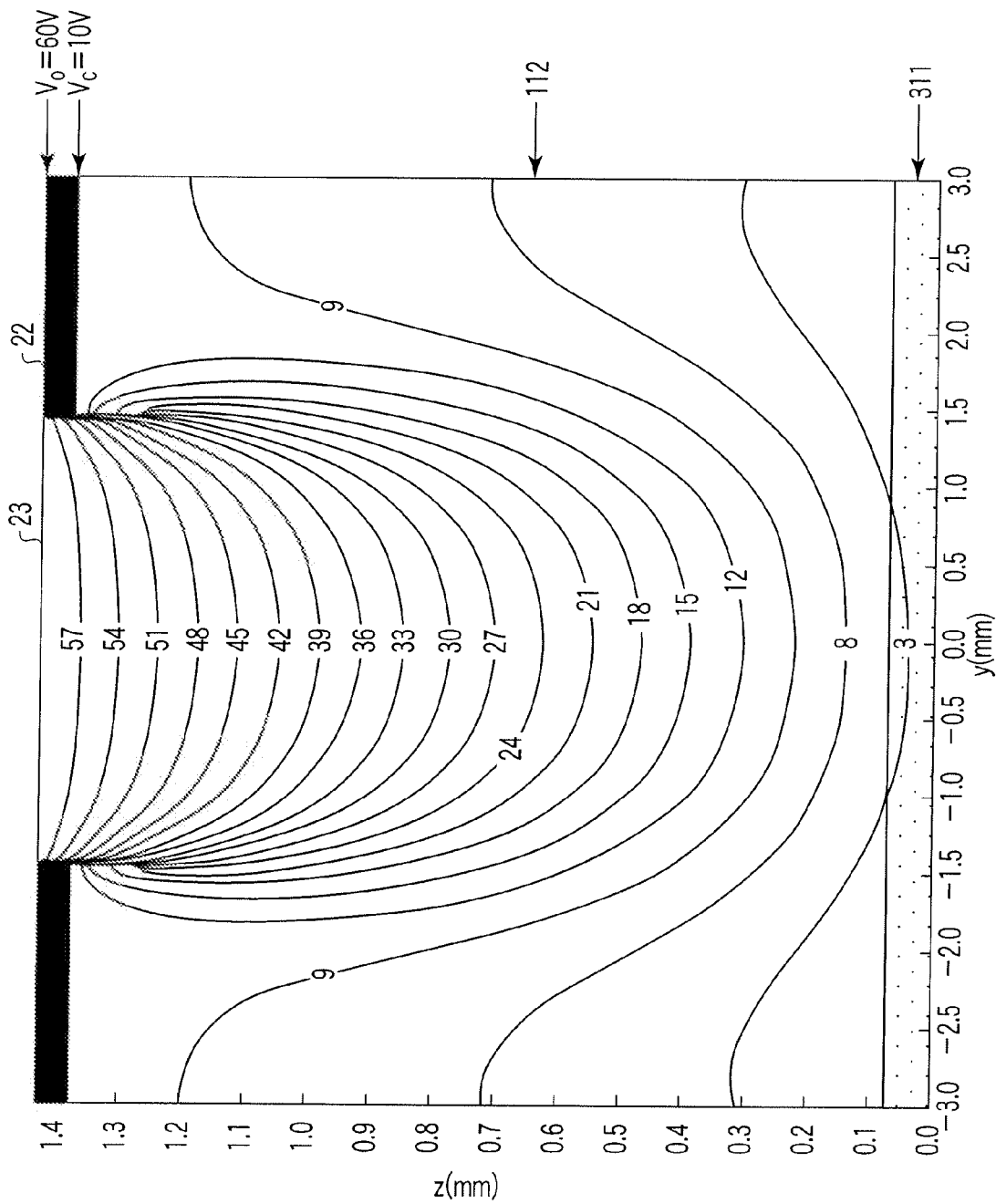
FIG. 15 is a diagram showing a potential distribution in the optical element of FIGS. 14A and 14B, and thus explaining the function of this optical element.

FIG. 15 depicts a potential distribution observed when the voltage Vo=60 V (i.e., fixed value for attaining optical properties) is applied between the first electrode 21 and the third electrode 23 and the second voltage (control voltage) Vc=10 V is applied between the first electrode 21 and the second electrode 22. In FIG. 15, z is the direction in which the optical axis extends, and y is a direction intersecting at right angles with the optical axis. Note, z, y and x are identical to their equivalents shown in FIGS. 1A and 1B. The potential distribution is inverse to the distribution shown in FIG. 2. This means that the liquid crystal lens works as a concave lens.

Figure 16A:
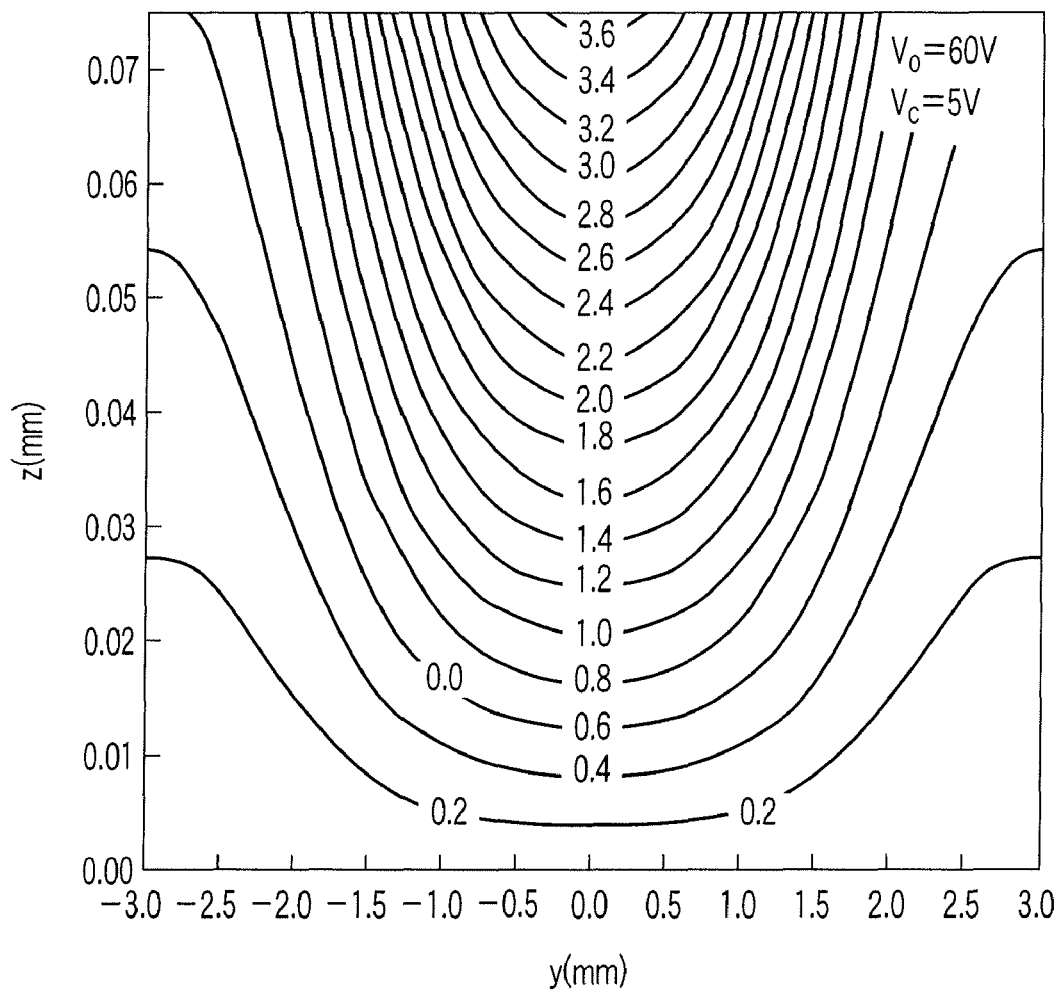
FIG. 16A is a diagram showing a first example in which the potential distribution changes in the optical element of FIGS. 14A and 14B, and thus explaining the function of this optical element according.

FIG. 16A and FIG. 16B show different potential distributions. FIG. 16A shows a potential distribution observed when Vo=60 V (i.e., fixed value for attaining optical properties) is applied between the first electrode 21 and the third electrode 23 and the second voltage (control voltage) Vc=5 V is applied between the second electrode 22. FIG. 16B shows a potential distribution observed when the second voltage (control voltage) Vc is changed to 20V and applied. The change in this potential difference corresponds to the inclination angle of the liquid crystal molecules and also to the refractive angle of light. The potential distributions shown in FIGS. 16A and 16B are inverse to those shown in FIGS. 3A and 3B. This means that the liquid crystal lens works as a concave lens.

Figure 17:
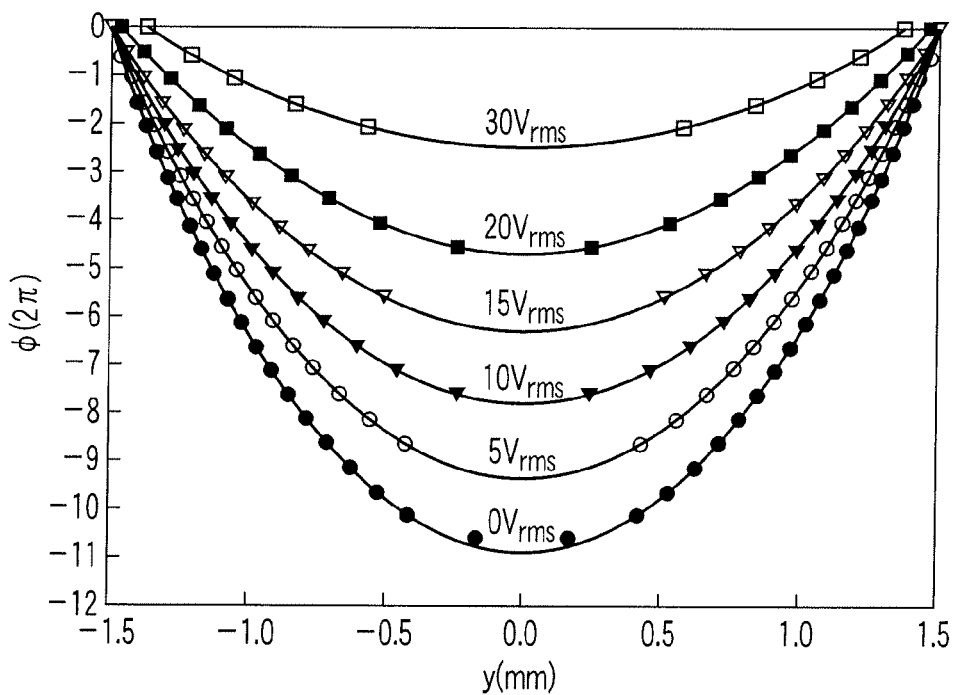
FIG. 17 is a diagram showing how a light wave passing through the optical element of FIG. 14 changes in optical phase, and thus explaining the function of this optical element.

FIG. 17 shows how light has an optical phase delay φ as it passes through the liquid crystal lens. Basically, the phase delay of a light wave has square-distribution characteristic. Therefore, its phase delay gradually decreases outwards from the y axis. As the control voltage (second voltage) is changed, the phase difference between the center of the lens and the periphery thereof is controlled. That is, the concave-lens property can be varied.

Figure 18:
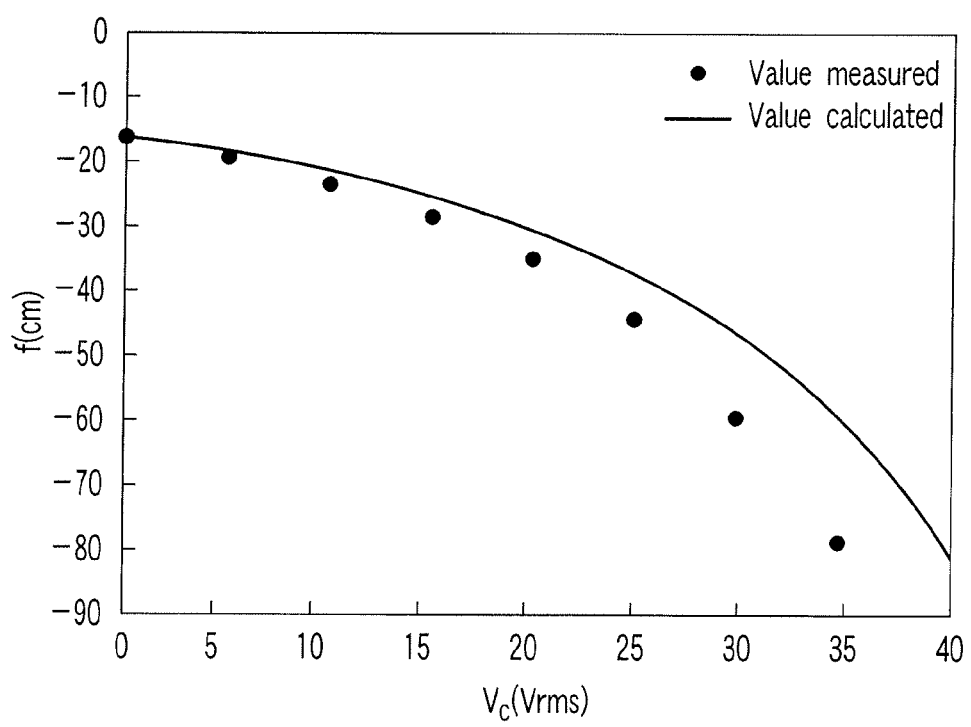
FIG. 18 is a diagram showing how the focal distance changes with the control voltage, and thus explaining the function of the optical element shown in FIG. 14.

FIG. 18 is a diagram showing how the focal distance changes with the control voltage Vc described above. When the control voltage Vc is varied, the focal distance is changed.

The present invention is not limited to the embodiments described above, in which the liquid crystal lens is either a convex lens or a concave lens. In the present invention, a convex lens and a concave lens may be used in combination.

Figure 19:
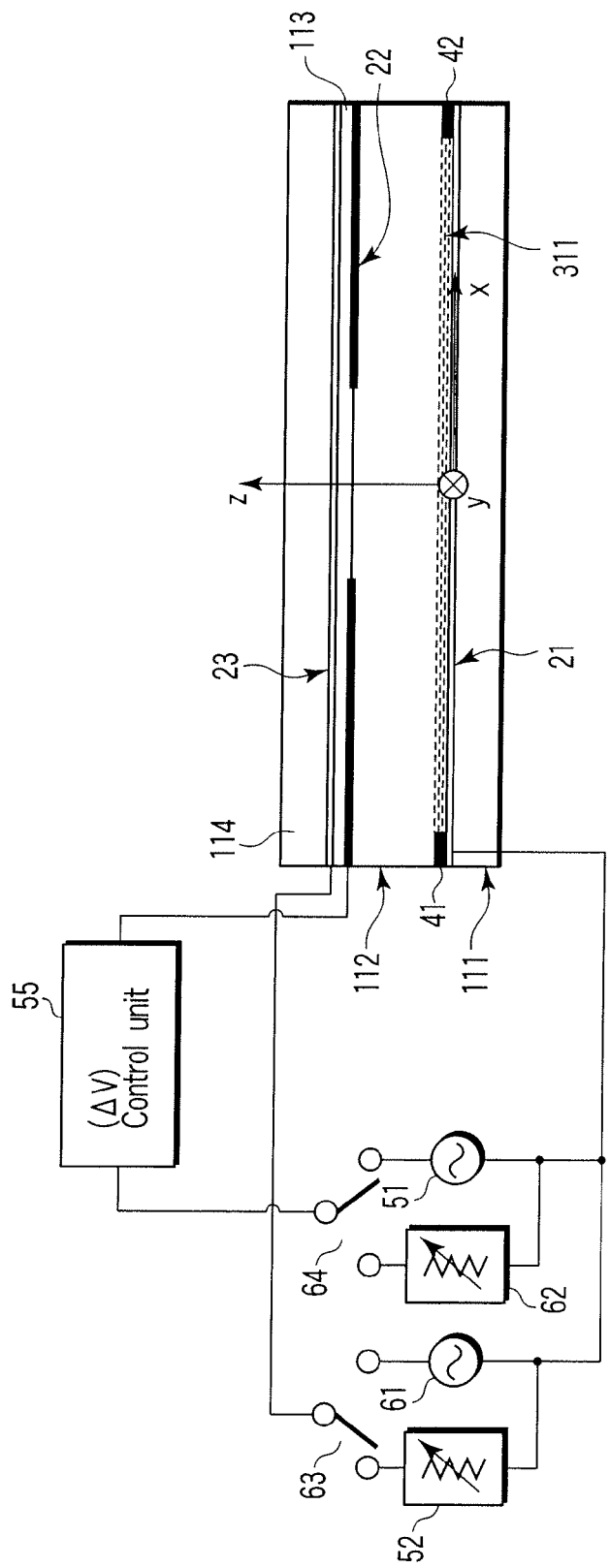
FIG. 19 is a diagram showing the configuration of another embodiment of the optical element according to the present invention.

FIG. 19 shows a multi-function lens that is a combination of the embodiment of FIGS. 1A and 1B (i.e., an embodiment that functions as a convex lens) and the embodiment of FIGS.

9A and 9B (i.e., an embodiment in which the focal position can be controlled in a three-dimensional fashion) and the embodiment of FIGS. 14A and 14B (i.e., an embodiment that functions as a concave lens). The function of this lens can be switched the switch 63 and 64, between the convex-lens function and the concave-lens function. While the lens is functioning as a convex lens, the voltages applied to the segments of the second electrode are minutely adjusted independently of one another, thereby to the focus in a three-dimensional fashion. While the lens is functioning as a concave lens, too, the voltages applied to the segments of the second electrode may be controlled independently of one another.

The present invention is not limited to the embodiments described above. The components of any embodiment can be modified in various manners in reducing the invention to practice, without departing from the sprit or scope of the invention. Further, the components of any embodiment described above may be combined, if necessary, in various ways to make different inventions. For example, some of the component of any embodiment may not be used. Moreover, the components of the different embodiments may be combined in any desired fashion. The shape of the third electrode may be defined by a sine-wave function, the superimposed function of a sine-wave function, or an any power function. In the embodiments described above has one liquid crystal lens. Nonetheless, a plurality of liquid crystal lenses may be arranged, forming a linear array or a two-dimensional array.

Optical elements according to the present invention can be used in various ways. They may be used as magnifying lenses or in the visual-sense unit for use in robots.

What is claimed is:

1. A liquid crystal lens, comprising:
a first substrate having a first electrode;
a second substrate which faces the first electrode of the first substrate in parallel;
a second electrode arranged outside the second substrate, the outside being an opposite side of the first substrate, and the second electrode having a hole;
a liquid crystal layer provided between the first substrate and the second substrate and constituted by oriented liquid crystal molecules;
an insulating layer attached to the second electrode and an inside area of the hole on the second substrate;
a third electrode, which is transparent, being arranged and in contact with the insulating layer and covering the hole;
a first voltage-applying unit configured to apply a first voltage between the first electrode and the second electrode to control an orientation of the liquid crystal molecules; and
a second voltage-applying unit configured to apply a second voltage between the first electrode and the third electrode to control the orientation of the liquid crystal molecules, the second voltage being independent of the first voltage, wherein
the first and second substrates and the liquid crystal layer have parallel and planar structures,
the second substrate does not include a hole,
the first and second substrates and the third electrode are not deformed even when the focus is to be changed,
an opening portion of the liquid crystal lens corresponds to the hole, and
the first voltage has a fixed value that imparts optimal first-stage optical properties to the liquid crystal lens by influencing the liquid crystal layer, and the second voltage is changed to vary second-stage optical properties of the liquid crystal lens by influencing the same liquid crystal layer.

2. A liquid crystal lens, comprising:
a first substrate having a first electrode;
a second substrate which faces the first electrode of the first substrate in parallel;
a second electrode arranged outside the second substrate, the outside being an opposite side of the first substrate, and the second electrode having a hole;
a liquid crystal layer provided between the first substrate and the second substrate and constituted by oriented liquid crystal molecules;
an insulating layer attached to the second electrode and an inside area of the hole on the second substrate;
a third electrode, which is transparent, being arranged and in contact with the insulating layer and covering the hole;
a first voltage-applying unit configured to apply a first voltage between the first electrode and the second electrode to control an orientation of the liquid crystal molecules; and
a second voltage-applying unit configured to apply a second voltage between the first electrode and the third electrode to control the orientation of the liquid crystal molecules, the second voltage being independent of the first voltage, wherein
the first and second substrates and the liquid crystal layer have parallel and planar structures,
the second substrate does not include a hole,
the first and second substrates and the third electrode are not deformed even when the focus is to be changed,
an opening portion of the liquid crystal lens corresponds to the hole, and
the second voltage has a fixed value that imparts optimal first-stage optical properties to the liquid crystal lens by influencing the liquid crystal layer, and the first voltage is changed to vary second-stage optical properties of the liquid crystal lens by influencing the same liquid crystal layer.

* * * * *